United States Patent [19]

Kishi

[11] Patent Number: 5,417,268
[45] Date of Patent: May 23, 1995

[54] PNEUMATIC RADIAL TIRE FOR HEAVY LOADS

[75] Inventor: Atao Kishi, Hiratsuka, Japan

[73] Assignee: The Yokohama Rubber Co., Ltd., Tokyo, Japan

[21] Appl. No.: 154,450

[22] Filed: Nov. 19, 1993

[30] Foreign Application Priority Data

Dec. 4, 1992 [JP] Japan .................. 4-325692

[51] Int. Cl.$^6$ ............................................. B60C 11/13
[52] U.S. Cl. ................................................. 152/209 R
[58] Field of Search .................. 152/209 R, 209 D

[56] References Cited

U.S. PATENT DOCUMENTS

| 4,284,115 | 8/1981 | Ohnishi | 150/209 R |
| 4,945,963 | 8/1990 | Fujiwara | 152/209 R |

FOREIGN PATENT DOCUMENTS

| 0022601 | 1/1989 | Japan | 152/209 D |
| 1153304 | 6/1989 | Japan | 152/209 D |
| 2182505 | 7/1990 | Japan | 152/209 D |
| 3186405 | 8/1991 | Japan | 152/209 D |
| 3246104 | 11/1991 | Japan | 152/209 R |

Primary Examiner—Steven D. Maki
Attorney, Agent, or Firm—Nikaido, Marmelstein, Murray & Oram

[57] ABSTRACT

A pneumatic radial tire for heavy loads having block type tread pattern defined by a plurality of grooves provided on a tread surface thereof and by a plurality of blocks segmented and formed by the plurality of grooves, characterized in that each of at least such ones of the plurality of grooves which traverse the plurality of blocks in a width direction of the tire, having a sectional shape on each side of the groove, taken in a direction crossing the groove, the sectional shape of the grooves, comprises: a slanted linear line positioned on a bottom side of the groove and expanding outwardly toward the tread surface; and a circular arc line positioned on a side of the tread surface, an inward end of which contacting the linear line, and an outward end of which contacting the tread surface.

5 Claims, 2 Drawing Sheets

PNEUMATIC RADIAL TIRE FOR HEAVY LOADS

BACKGROUND OF THE INVENTION

The present invention relates to a pneumatic radial tire for heavy loads having a block type tread pattern, and more particularly to a pneumatic radial tire for heavy loads having improved uneven wear resistance and steering stability without lowering traction performance specific to the block type pattern.

In order to secure a good traction performance on wet roads or snow-covered roads for a pneumatic radial tires for heavy loads, it is well known that it is effective to employ a block type tread pattern. However, when the tread pattern is based on a block design, tread rigidity tends to decrease due to a block construction. And it causes each block to slide on the road upon braking or driving, so that uneven wear such as heel-and-toe abrasion which involves different amounts of wear between the frontal and rear edges in each block in the rotation direction of the tire readily occurs, and also steering stability is lowered.

Therefore, in order to prevent the uneven wear from taking place and the steering stability from lowering, countermeasures such as providing shallow grooves around blocks have been taken heretofore. According to the above countermeasures, however, there has been such a problem that part of the grooves disappear before a complete wear of the tread takes place, thereby lowering the traction performance.

SUMMARY OF THE INVENTION

An object of the present invention is to provide a pneumatic radial tire for heavy loads having a block type tread pattern in which uneven wear resistance and steering stability have been improved.

Another object of the present invention is to provide a pneumatic radial tire for heavy loads which is capable of securing an excellent traction performance on wet roads and snow-covered roads.

A pneumatic radial tire for heavy loads of the present invention, which accomplishes the above-mentioned objects, has a block type tread pattern which is composed of a plurality of grooves provided on a tread surface and a plurality of blocks partitioned by these plurality of grooves so as to form respective block segments, characterized in that each of at least such ones of said plurality of grooves which traverse said plurality of blocks in a lateral direction of the tire, having a sectional shape on each side of the groove, taken in a direction crossing the groove, the sectional shape of the grooves comprising a slanted linear line on a bottom side of the groove widening its width toward said tread surface and a circular arc line on a side of the tread surface of which an inner end contacts said linear line and of which an outer end contacts said tread surface.

Through such arrangement that a sectional shape of the grooves extending in a width direction of the tire is formed of a slanted linear line on a bottom side of the groove expanding outwardly toward the tread surface and of a circular arc line near the tread surface, it is possible to provide each block with bending rigidity approximated to that of a beam of uniform strength, namely, thereby it is capable of distributing the bending rigidity corresponding to a displacement in the block on which a force is exerted. As a result, rigidity relative to a volume of the block is improved efficiently to enable a contact pressure to the block from a road surface to be uniformly distributed, thereby the uneven wear resistance and the steering stability can be improved. Further, since the bending rigidity approximated to that of the beam of uniform strength is provided to respective blocks, there is no need any more to make the grooves surrounding respective blocks shallower as have been practiced heretofore, thereby the traction performance is not be lowered.

DETAILED DESCRIPTION OF PREFERRED EMBODIMENT

Figure 1:
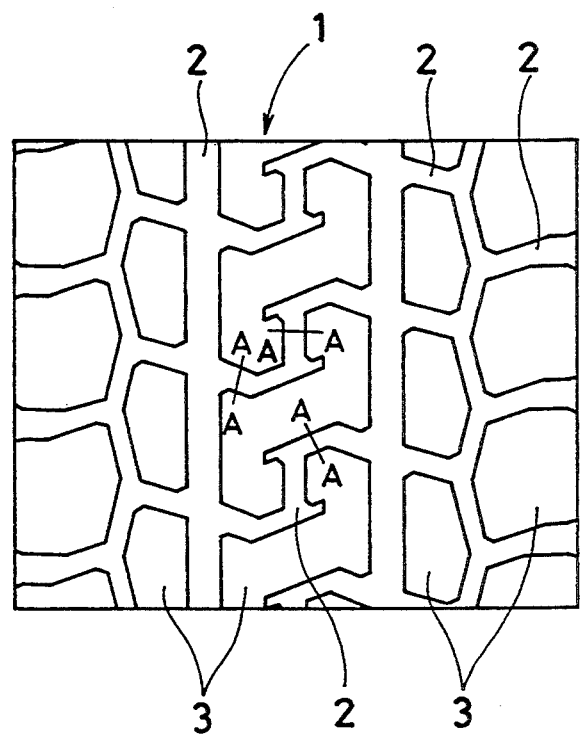
FIG. 1 is a plan view showing an example of a principal portion of a tread pattern of a pneumatic radial tire for heavy loads according to the present invention.
Figure 2:
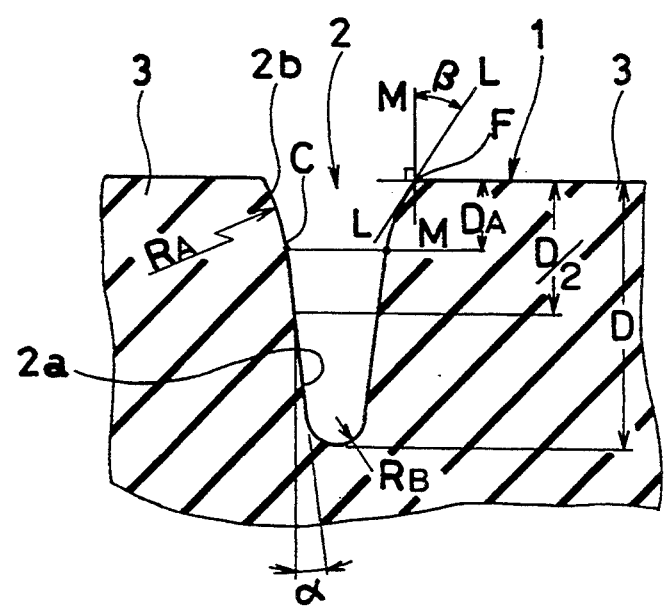
FIG. 2 is a cross-sectional view taken along lines A—A in FIG. 1.

With reference to FIG. 1, numeral 1 denotes a tread surface of a pneumatic radial tire for heavy loads according to the present invention. A plurality of grooves 2 extending in a circumferential direction and width direction of the tire are provided on the tread surface 1, so as to form a plurality of block segments 3 partitioned by these plurality of grooves 2. As shown in FIG. 2, each of at least such ones of said plurality of grooves which traverse said plurality of blocks in the width direction of the tire, having a sectional shape on each side of the groove, taken in a direction perpendicularly crossing each of the grooves, the sectional shape of the grooves is formed such that a bottom portion thereof is of a circular arc, a bottom side extending therefrom is of a linear line $2a$ which is tilted in a manner that the linear line $2a$ is widennig a width of the groove 2 toward the tread surface 1, and a side of the tread surface 1 is of a circular arc line $2b$ curved convexedly toward the groove, an inward end of which contacting an outward end of the linear line $2a$ and an outward end of which contacting the tread surface 1.

By forming the plurality of blocks 3 segmented by the plurality of the grooves 2 as described above, each block 3 has bending rigidity approximately the same as that of a beam of uniform strength. Namely, the block rigidity is greater on the bottom side of the groove as the sectional shape thereof is slanted linearly so as to expand outwardly, and a pressure from the road is absorbed flexibly at the side of the tread surface in each block as the section shape thereof is circular arc. Accordingly the bending rigidity is distributed according to a displacement in the blocks on which a force is exerted from the ground. Thereby, since a contact pressure to the blocks 3 coming from the road can be distributed uniformly while sufficiently maintaining the ridigity of the blocks 3, it is possible to substantially improve the uneven wear resistance of the tire and the steering stability in driving as well. Further, since a depth D of the groove 2 can be further increased while improving the uneven wear resistance and the steering stability as well, a preferred traction performance on wet roads or snow-covered roads can be secured.

According to the present invention, it is preferable for an inclination angle $\alpha$ of the line $2a$ relative to a perpendicular line to the tread surface to be 3 to 18 degrees. By rendering the angle α to be 3° or more as above, a sufficient rigidity against a width force is obtained for the blocks 3, thereby an improved steering stability can be achieved. The reason the upper limit of the angle α is determined to be 18 degrees is that when the inclination angle α exceeds 18 degrees, a sufficient ground contact area cannot be obtained for the blocks 3, unless a radius of curvature $R_B$ of the bottom portion in the groove is minimized.

On the other hand, it is preferable for a radius of curvature $R_A$ of the circular arc line $2b$ on the side of the tread surface to have the following relation with respect to a depth D of the groove 2; $0.2 D \leq R_A \leq 2.5 D$. By specifying the radius of curvature $R_A$ to be 0.2 D or more and 2.5 D or less, the pressure from the road to the blocks is flexibly absorbed and a floating phenomenon taking place at the edge portions of the blocks 3 is suppressed, thereby an improvement in the uneven wear resistance becomes possible.

Further, it is preferable for the depth $D_A$ of a point of contact C where the linear line $2a$ on the groove bottom side meets the circular arc line $2b$ on the side of the tread surface 1 to have the following relation with respect to the depth D of the groove 2; $0.1 D \leq D_A \leq 0.5 D$. Further, it is preferable for an angle β between a tangential line L—L to the circular arc line at a point of contact F where the circular arc line $2b$ meets the tread surface 1 and a perpendicular line M—M which passes the point of contact F and is perpendicular to the tread surface 1 to be determined $15° \leq β \leq 50°$. As heretofore described, by providing such arrangement that the linear line $2a$ is located not more than half the groove depth D away from the groove bottom and the circular arc line $2b$ is allowed to contact the linear line $2a$ at any point which is deeper than 0.1 D on the side of the tread surface 1, improvements in both the aforementioned uneven wear resistance and the steering stability can be accomplished at the same time.

Sectional shapes on both sides of the aforementioned groove 2 may be symmetrical or unsymmetrical with respect to right and left in a perpendicularly crossing direction of the groove 2.

EXAMPLES

Various types of pneumatic radial tires for heavy loads were manufactured as described below, each of which having a tire size of 12R22.5 and a tread pattern as shown in FIG. 1 but having a different sectional shape.

Figure 3:
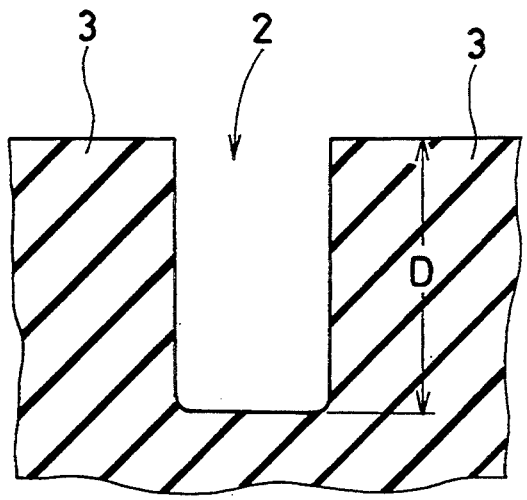
FIG. 3 is a cross-sectional view showing an example of a groove portion of a comparative tire.
Figure 4:
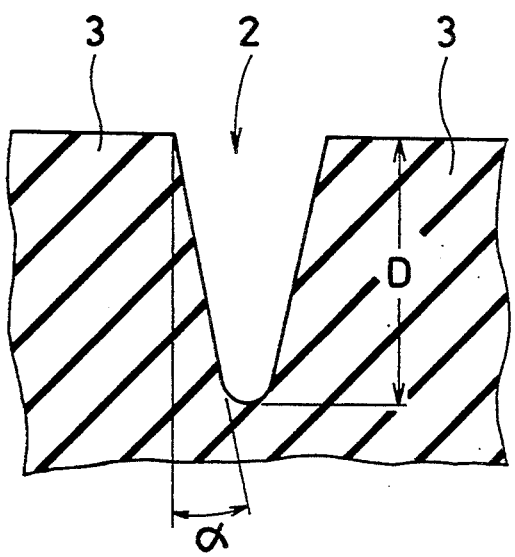
FIG. 4 is a cross-sectional view showing another example of a groove portion of a comparative tire.

Tire 1 according to the present invention
  Groove sectional shape: same as shown in FIG. 2
  Groove depth D: 17 mm
  Depth DA of a point of contact C: 4.5 mm
  Radius of curvature $R_A$: 15 mm
  Inclination angle α: 7°
  Angle β: 25°
Tire 2 according to the present invention
  Groove sectional shape: same as shown in FIG. 2
  Groove depth D: 17 mm
  Depth $D_A$ of a point of contact C: 2.0 mm
  Radius of curvature $R_A$: 3.4 mm
  Inclination angle α: 7°
  Angle β: 45°
Tire 3 according to the present invention
  Groove sectional shape: same as shown in FIG. 2
  Groove depth D: 17 mm
  Depth $D_A$ of a point of contact C: 8.5 mm
  Radius of curvature $R_A$: 42.5 mm
  Inclination angle α: 7°
  Angle β: 19°
Tire 4 according to the present invention
  Groove sectional shape: same as shown in FIG. 2
  Groove depth D: 17 mm
  Depth $D_A$ of a point of contact C: 4.5 mm
  Radius of curvature $R_A$: 15 mm
  Inclination angle α: 3°
  Angle β: 21°
Comparative tire 1
  Groove sectional shape: as shown in FIG. 3
  Groove depth D: 17 mm
  Inclination angle α: 0°
Comparative tire 2
  Groove sectional shape: as shown in FIG. 4
  Groove depth D: 17 mm
  Inclination angle α: 19°

The foregoing tires 1 through 4 according to the present invention and the comparative tires 1, 2 were compared by the following test methods and evaluated in terms of the steering stability and uneven wear resistance, the results of which are shown in Table 1.

Steering stability

Test tires with air pressure filled to 7.25 kg/cm² were installed on a bus, and a feel evaluation test was conducted by 10 test drivers at speeds of 80 to 100 km/h while changing the driving lanes. The results of evaluation are shown in values of index relative to the comparative tire 2 the feeling evaluation of which is taken as 100. It is intended to mean that the greater the values of index, the better the steering stability.

Uneven wear resistance

Test tires with air pressure filled to 7.25 kg/cm² were installed on a bus, and the tread surfaces of the test tires were evaluated visually by appearance thereof after 10,000 km run. The results of evaluation were shown in values of index relative to the conparative tire 2 assuming as 100. It is intended to mean that the greater the values of index, the better the uneven wear resistance.

TABLE 1

|  | Tire of the Invention 1 | Tire of the Invention 2 | Tire of the Invention 3 | Tire of the Invention 4 | Comparative tire 1 | Comparative tire 2 |
| --- | --- | --- | --- | --- | --- | --- |
| Steerability | 140 | 130 | 137 | 133 | 80 | 100 |
| Uneven wear resist. | 137 | 110 | 120 | 130 | 80 | 100 |

As is obviously understood from table 1, the tires 1 through 4 according to the present invention have been able to improve the steering stability as well as the uneven wear resistance in comparison with the comparative tires 1 and 2, because of the unique arrangement that a sectional shape of the grooves is comprised, on the a bottom side thereof, of a linear line which is slanted so as to expand outwardly toward the tread surface, and on a side of the tread surface thereof, of the circular arc line. According to traction performance, since all of the foregoing tires have the same groove depth, respective traction performances are approximately the same.

As hereinabove set forth, in a pneumatic radial tire for heavy loads having a block type tread pattern according to the invention, at leaset a sectional shape on each side of the grooves extending in a width direction of the tire is comprised, on a bottom side of the groove thereof, of a linear line which is slanted to expand outwardly toward the tread surface, and on a side of the tread surface thereof, of a circular arc line an inward end of which contacts said linear line and an outward end of which contacts the tread surface, thereby respective block segments are provided with bending rigidity approximated to that of a beam of uniform strength. Therefore, since the contact pressure to the block segments adding from the road can be distributed uniformly, the uneven wear resistance as well as the steering stability can be improved. In addition, because it is no longer required for the grooves around the block segments to be shallowed, a lowering in the traction performance on wet roads or snow-covered roads is prevented.

What is claimed is:

1. A pneumatic radial tire for heavy loads having a block type tread pattern defined by a plurality of grooves provided on a tread surface thereof and by a plurality of blocks segmented and formed by said plurality of grooves, wherein each of at least such ones of said plurality of grooves which traverse said plurality of blocks in a width direction of the tire, having a sectional shape on each side of the groove, taken in a direction crossing the groove, the sectional shape of the grooves comprising: a slanted linear line positioned on a bottom side of the groove and expanding outwardly toward said tread surface, said linear line having an inclination angle $\alpha$ with respect to a perpendicular line to the tread surface defined as $3° \leq \alpha \geq 18°$, and a circular arc line positioned on a side of said tread surface having an inward end contacting said linear line at a first point of contact, and an outward end non-tangentially contacting said tread surface at a second point of contact, said circular arc line having a radius of curvature $R_A$ with respect to a depth D of said groove defined as $0.2 D \leq R_A \geq 2.5 D$; a depth $D_A$ from the tread surface of said first point of contact is defined with respect to said depth D of said groove as $0.1 D \leq D_A \geq 0.5 D$; and an angle $\beta$ formed between a tangential line to the circular arc line at said second point of contact and a perpendicular line which passes said second point of contact is specified to be $15° \leq \beta \geq 50°$ thereby providing each block with a bending strength approximated to the bending strength of a cantilever beam of uniform strength.

2. A pneumatic radial tire for heavy loads according to claim 1, wherein sectional shapes on both sides of said groove are widthly symmetrical.

3. A pneumatic radial tire for heavy loads according to claim 1, wherein sectional shapes on both sides of said groove are widthly unsymmetrical.

4. A pneumatic radial tire for heavy loads according to claim 1, wherein a bottom portion of said groove adjacent to said linear line comprises a second circular arc.

5. A pneumatic radial tire for heavy loads according to claim 1, wherein:

a sectional shape of each side of grooves extending in a circumferential direction of the tire, taken in section in a direction crossing the groove comprises: a second slanted linear line positioned on a bottom side of the groove and expanding outwardly toward said tread surface, and a third circular arc line positioned on a side of said tread surface having an inward end contacting said linear line, and an outward end contacting said tread surface.

* * * * *